US012634853B2

(12) United States Patent
Zhang et al.

(10) Patent No.: US 12,634,853 B2
(45) Date of Patent: May 19, 2026

(54) METHOD AND APPARATUS FOR SELECTING CLOCK SOURCE

(71) Applicant: Huawei Technologies Co., Ltd., Shenzhen (CN)

(72) Inventors: Yawei Zhang, Beijing (CN); Jingfei Lyu, Wuhan (CN); Songyan Chen, Beijing (CN); Cong Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 380 days.

(21) Appl. No.: 18/336,891

(22) Filed: Jun. 16, 2023

(65) Prior Publication Data

US 2023/0362854 A1 Nov. 9, 2023

Related U.S. Application Data

(63) Continuation of application No. PCT/CN2021/139372, filed on Dec. 17, 2021.

(30) Foreign Application Priority Data

Dec. 18, 2020 (CN) .......................... 202011507206.5

(51) Int. Cl.
*H04W 56/00* (2009.01)
*H04J 3/06* (2006.01)

(52) U.S. Cl.
CPC ....... *H04W 56/0015* (2013.01); *H04J 3/0658* (2013.01)

(58) Field of Classification Search
CPC ...... H04J 3/0641; H04J 3/0658; H04J 3/0667; H04J 3/0688; H04W 56/0015
(Continued)

(56) References Cited

U.S. PATENT DOCUMENTS 6,754,171 B1 * 6/2004 Bernier ................. H04J 3/0688
370/216
9,310,832 B2 * 4/2016 Frels ......................... G06F 1/12
(Continued)

FOREIGN PATENT DOCUMENTS

CN 102006135 A 4/2011
CN 102263630 A 11/2011
(Continued)

OTHER PUBLICATIONS

ITU-T G.8275.1/Y.1369.1, "Series G: Transmission Systems and Media, Digital Systems and Networks, Packet over Transport aspects—Synchronization, quality and availability targets, Series Y: Global Information Infrastructure, Internet Protocol Aspects and Next-Generation Networks, Internet of Things and Smart Cities, Precision time protocol telecom profile for phase/time synchronization with full timing support for the network," Jun. 2016, 56 pages.
(Continued)

*Primary Examiner* — Robert J Lopata
(74) *Attorney, Agent, or Firm* — Conley Rose, P.C.

(57) ABSTRACT

A method for selecting a clock source includes a first network device that obtains synchronization offset data between the first network device and a second network device through a first port in a clock synchronization failed state. The first network device determines, based on the synchronization offset data, whether to refer to, during clock source selection, clock information received by the first port.

30 Claims, 4 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2010/0189127 A1* | 7/2010 | Suzuki | .................. | H04J 3/0641 |
| | | | | 370/465 |
| 2014/0086375 A1* | 3/2014 | Secker | ................... | H04J 3/065 |
| | | | | 375/356 |
| 2015/0318941 A1* | 11/2015 | Zheng | .................. | H04J 3/0697 |
| | | | | 370/503 |
| 2015/0350111 A1* | 12/2015 | Xiu | ......................... | H04L 49/15 |
| | | | | 370/254 |
| 2017/0359790 A1* | 12/2017 | Wang | .................... | H04J 11/005 |
| 2019/0363973 A1* | 11/2019 | Hsieh | ..................... | H04L 69/40 |
| 2021/0328696 A1 | 10/2021 | Lv et al. | | |
| 2021/0385058 A1* | 12/2021 | Guignard | ............... | H04L 69/28 |
| 2022/0190945 A1* | 6/2022 | Lv | ......................... | H04J 3/0641 |
| 2022/0263677 A1* | 8/2022 | Neugeboren | ...... | H04N 21/6118 |
| 2022/0337384 A1* | 10/2022 | Lv | ......................... | H04L 7/0008 |
| 2023/0262625 A1* | 8/2023 | Lyu | .................... | H04W 56/001 |
| | | | | 370/350 |
| 2024/0146566 A1* | 5/2024 | Neugeboren | ...... | H04N 21/6118 |

FOREIGN PATENT DOCUMENTS

| | | | |
|---|---|---|---|
| CN | 104579534 A | 4/2015 |
| CN | 105024798 A | 11/2015 |
| CN | 112367137 A | 2/2021 |
| JP | H06104882 A | 4/1994 |
| JP | 2013207526 A | 10/2013 |
| JP | 2016152489 A | 8/2016 |
| JP | 2020188401 A | 11/2020 |
| WO | 2020135279 A1 | 7/2020 |

OTHER PUBLICATIONS

IEEE Std 1588-2019, (Revision of IEEE Std 1588-2008), "IEEE Standard for a Precision Clock Synchronization Protocol for Networked Measurement and Control Systems," IEEE Instrumentation and Measurement Society, Approved Nov. 7, 2019, 499 pages.

* cited by examiner

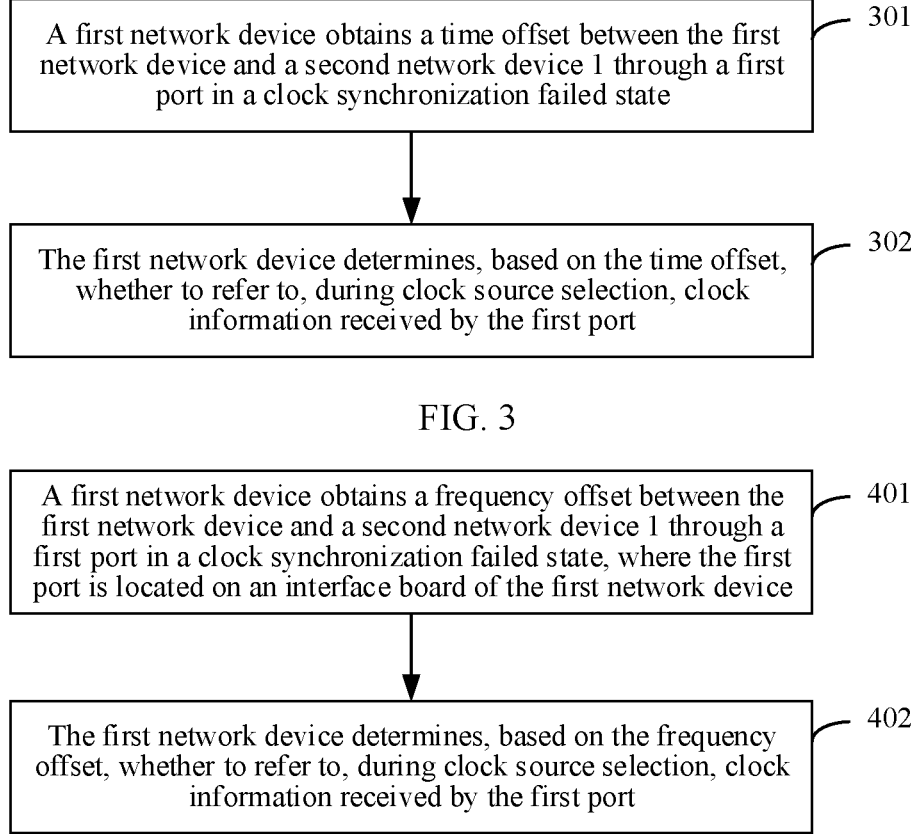

A first network device obtains a time offset between the first network device and a second network device 1 through a first port in a clock synchronization failed state — 301

The first network device determines, based on the time offset, whether to refer to, during clock source selection, clock information received by the first port — 302

FIG. 3

A first network device obtains a frequency offset between the first network device and a second network device 1 through a first port in a clock synchronization failed state, where the first port is located on an interface board of the first network device — 401

The first network device determines, based on the frequency offset, whether to refer to, during clock source selection, clock information received by the first port — 402

FIG. 4

METHOD AND APPARATUS FOR SELECTING CLOCK SOURCE

CROSS-REFERENCE TO RELATED APPLICATIONS

This application is a continuation of International Patent Application No. PCT/CN2021/139372 filed on Dec. 17, 2021, which claims priority to Chinese Patent Application No. 202011507206.5 filed on Dec. 18, 2020. The disclosures of the aforementioned applications are hereby incorporated by reference in their entireties.

TECHNICAL FIELD

The present disclosure relates to the field of communication, and in particular, to a method and an apparatus for selecting a clock source.

BACKGROUND

The fifth-generation (5G) network includes a plurality of clock sources, and each clock source has quality different from that of another clock source. A network element in the 5G network selects a clock source and synchronizes with the selected clock source. Generally, a network element selects a clock source with higher quality and synchronizes with the clock source.

When the network element synchronizes with the clock source, the clock source may fail. As a result, the network element reselects a clock source with lower quality and synchronizes with the clock source. After the clock source with higher quality recovers, operation and maintenance personnel are required to trigger the network element to synchronize with the clock source. As the network element cannot automatically select a clock source with higher quality for synchronization, operation and maintenance efficiency is low.

SUMMARY

The present disclosure provides a method and an apparatus for selecting a clock source, to implement automatic selection of a clock source with higher quality and improve operation and maintenance efficiency. The technical solutions are as follows.

According to a first aspect, the present disclosure provides a method for selecting a clock source. In the method, a first network device obtains synchronization offset data between the first network device and a second network device through a first port in a clock synchronization failed state. The first network device determines, based on the synchronization offset data, whether to refer to, during clock source selection, clock information received by the first port.

In the foregoing solution, the first network device automatically obtains the time offset between the first network device and the second network device through the first port in the clock synchronization failed state, and determines, based on the time offset, whether the clock input signal received by the first port recovers. When determining that the clock input signal recovers, the first network device refers to the clock information received by the first port during clock source selection. In this way, after the second network device communicating with the first port, the clock source, or a link connected to the first port is recovered from a failure, the first network device automatically detects the situation, and uses the first port as a reference object during clock source selection, to timely and automatically select a clock source with higher quality for synchronization, thereby improving operation and maintenance efficiency.

In a possible implementation, when the synchronization offset data is less than an offset threshold, the first network device refers to the clock information received by the first port during clock source selection. When the synchronization offset data is less than the offset threshold, it indicates that a clock input signal received by the first port recovers. The first network device refers to the clock information received by the first port during clock source selection, to timely and automatically selects a clock source with higher quality for synchronization, thereby improving operation and maintenance efficiency.

In another possible implementation, a port attribute of the first port includes tag information, and the tag information indicates that the first port is in a clock synchronization failed state. When the synchronization offset data is less than the offset threshold, the first network device sets the tag information to indicate that the first port is in a clock synchronization normal state. When the first port is in the clock synchronization normal state, the first network device refers to the clock information received by the first port only during clock source selection. Therefore, the first network device sets the tag information to indicate that the first port is in the clock synchronization normal state, to ensure that the first network device refers to the clock information received by the first port during clock source selection.

In another possible implementation, the first network device obtains the synchronization data between the first network device and the second network device through the first port, where a state of the first port is a first state. The first network device obtains the synchronization offset data between the first network device and the second network device based on the synchronization data. Because the state of the first port is the first state, the synchronization data can be obtained through the first port, and the synchronization offset data can further be accurately obtained.

In another possible implementation, the first state includes a slave state, a master state, a monitor state, or a passive state. In this way, it is ensured that the synchronization data between the first network device and the second network device can be obtained through the first port.

In another possible implementation, the first network device sets the state of the first port to a first state. In this way, it is ensured that the synchronization data between the first network device and the second network device can be obtained through the first port.

In another possible implementation, the first network device periodically sets the state of the first port to the first state, where the first state includes a slave state, a monitor state, or a passive state. In this way, the synchronization data is obtained only when the state of the first port changes to the first state, so that the first network device does not need to obtain the synchronization data in real time through the first port, thereby reducing occupation of network resources and computing resources of the first network device.

In another possible implementation, when the first state is the slave state, the first network device controls the clock of the first network device not to be adjusted based on the clock input signal of the first port. In this way, before the clock input signal received by the first port recovers, a synchronization error caused by adjusting the clock of the first network device based on the clock input signal can be avoided.

In another possible implementation, the first network device receives a synchronization Sync packet sent by the second network device, where the Sync packet includes a sending time T1 at which the second network device sends the Sync packet, and determines a receiving time T2 at which the Sync packet is received. The first network device sends a delay request (Delay_Req) packet to the second network device, and determines a sending time T3 at which the Delay_Req packet is sent. The first network device receives a delay response Delay_Resp packet sent by the second network device, where the Delay_Resp packet includes a receiving time T4 at which the second network device receives the Delay_Req packet and the synchronization data includes several of T1, T2, T3, and T4.

In another possible implementation, the synchronization offset data includes a time offset between the first network device and the second network device.

In another possible implementation, the first network device receives, through the first port, a first physical clock signal sent by the second network device. The first network device obtains a frequency offset between the first network device and the second network device based on the first physical clock signal and a second physical clock signal, where the second physical clock signal is a local signal of the first network device. The frequency offset is the synchronization offset data. In this way, whether a physical clock signal received by the first port recovers can be determined based on the frequency offset.

In another possible implementation, the first network device controls the clock of the first network device not to be adjusted based on the first physical clock signal. In this way, before the physical clock signal received by the first port recovers, a synchronization error caused by adjusting the clock of the first network device based on the physical clock signal received by the first port can be avoided.

According to a second aspect, the present disclosure provides an apparatus for selecting a clock source configured to perform the method performed by the first network device in the first aspect or any possible implementation of the first aspect. Specifically, the apparatus includes a unit configured to perform the method performed by the first network device in the first aspect or any possible implementation of the first aspect.

According to a third aspect, the present disclosure provides an apparatus for selecting a clock source, where the apparatus includes a transceiver, a processor, and a memory. The transceiver, the processor, and the memory may be connected through an internal connection. The memory is configured to store a program, and the processor is configured to execute the program in the memory and cooperate with the transceiver, so that the apparatus completes the method performed by the first network device in the first aspect or any possible implementation of the first aspect.

According to a fourth aspect, the present disclosure provides a computer program product. The computer program product includes a program stored in a computer-readable storage medium, and the program is loaded by a device to implement the method in the first aspect or any possible implementation of the first aspect.

According to a fifth aspect, the present disclosure provides a computer-readable storage medium configured to store a program, and the program is loaded by a device to perform the method in the first aspect or any possible implementation of the first aspect.

BRIEF DESCRIPTION OF DRAWINGS

FIG. 3 is a flowchart of a method for selecting a clock source according to an embodiment of the present disclosure;

FIG. 4 is a flowchart of another method for selecting a clock source according to an embodiment of the present disclosure;

DESCRIPTION OF EMBODIMENTS

The following further describes embodiments of the present disclosure in detail with reference to accompanying drawings.

The following is a brief introduction to concepts in the present disclosure.

Synchronization offset data is for describing an offset between a first network device and a second network device, and includes a time offset between the first network device and the second network device, or a frequency offset between the first network device and the second network device.

An offset threshold includes a time offset threshold or a frequency offset threshold.

A first port is a port on the first network device for communicating with the second network device.

A first state is a state which the first port is in. When the first port is in the first state, the first port can send a delay request (Delay Req) packet to the second network device, and/or receive a delay response (Delay Resp) packet sent by the second network device in response to the Delay Req packet.

Figure 1:
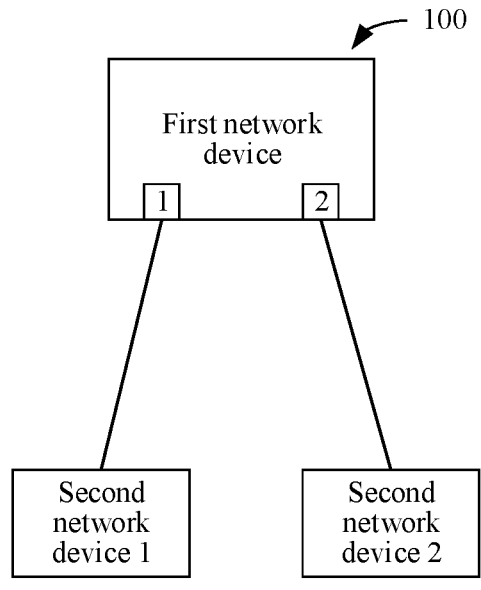
FIG. 1 is a schematic diagram of a network architecture according to an embodiment of the present disclosure.

Refer to FIG. 1. The present disclosure provides a network architecture 100, including: a first network device and at least one second network device, where each of the second network devices communicates with the first network device.

The first network device includes at least one port, and each of the second network devices communicates with one port of the first network device.

Each of the second network devices is configured to send data, including clock information, time, a physical clock signal, and/or the like. The clock information includes information such as a clock level, indicating clock source quality. Optionally, the clock information is clock information carried in an announce packet sent by the second network device or clock information carried in a synchronization status message (SSM) packet sent by the second network device.

The time mentioned above is a time of the second network device for sending, and includes a time carried in a synchronization (Sync) packet sent by the second network device, a time carried in a Delay Resp packet sent by the second network device, and the like.

For each second network device, the second network device is directly connected to the first network device, or a link between the second network device and the first network device passes through at least one other network device, but each of the at least one other network device transparently transmits a packet between the first network device and the second network device.

The second network device may be a clock source, or a network device through which a link between the first network device and a clock source passes.

The first network device may receive clock information through each port of the first network device, and perform a clock source selection operation based on the clock information received by each port. The first network device selects a port after performing the clock source selection operation. For ease of description, the selected port is referred to as a first port, and a second network device communicating with the first port is referred to as a second network device 1. The clock source indicated by the clock information received by the first port may have highest quality. In this case, the state of the first port is a slave state. The first network device receives a clock input signal through the first port in the slave state, where the clock input signal may include a time or a physical clock signal sent by the second network device 1, and adjusts a clock of the first network device based on the clock input signal, to achieve synchronization between a time of the clock of the first network device and a time of a clock of the second network device 1, or synchronization between a frequency of the clock of the first network device and a frequency of a clock of the second network device 1.

Optionally, when the clock input signal includes the time of the second network device 1 for sending, the time of the second network device 1 for sending includes a time carried in a Sync packet sent by the second network device 1 and a time carried in a Delay Resp packet sent by the second network device 1. The first network device adjusts the clock of the first network device based on the time of the second network device 1 for sending, to achieve synchronization between the time of the clock of the first network device and the time of the clock of the second network device 1.

During implementation, the first network device receives, through the first port, a first Sync packet sent by the second network device 1, where the second network device 1 regularly or irregularly sends the Sync packet, the first Sync packet is a Sync packet currently sent by the second network device 1, and the first Sync packet includes a sending time Ta at which the second network device 1 sends the first Sync packet. The first network device obtains a receiving time Tb at which the first Sync packet is received, sends a first Delay Req packet to the second network device 1 through the first port, and obtains a sending time Tc at which the first Delay Req packet is sent. The first network device receives, through the first port, a first Delay Resp packet sent by the second network device 1 in response to the first Delay Req packet, where the first Delay Resp packet includes a receiving time Td at which the second network device 1 receives the first Delay Req packet. The first network device calculates a time offset between the first network device and the second network device 1 based on Ta, Tb, Tc, and/or Td, and adjusts the clock of the first network device based on the time offset.

Optionally, when the clock input signal includes the physical clock signal sent by the second network device 1, the first network device adjusts the clock of the first network device based on the physical clock signal, to achieve synchronization between the frequency of the clock of the first network device and the frequency of the clock of the second network device 1.

For example, as shown in FIG. 1, the first network device includes a port 1 and a port 2, and the at least one second network device includes a second network device 1 and a second network device 2. The second network device 1 communicates with the port 1, and the second network device 2 communicates with the port 2. The first network device receives, through the port 1, clock information 1 sent by the second network device 1, and receives, through the port 2, clock information 2 sent by the second network device 2, and performs a clock source selection operation based on the clock information 1 and the clock information 2. Assuming that the port 1 is selected after a clock source selection operation is performed and a state of the port 1 is a slave state, the first network device receives a clock input signal through the port 1, where the clock input signal may be a time or a physical clock signal sent by the second network device 1, and adjusts the clock of the first network device based on the clock input signal, to implement time synchronization between the clock of the first network device and the clock of the second network device 1 or implement frequency synchronization between the clock of the first network device and the clock of the second network device 1.

The clock input signal received by the first port may jump, causing the first network device to include tag information in the port attribute of the first port, and the tag information indicates that the first port is in a clock synchronization failed state. In this case, the first network device performs a clock source selection operation from ports excluding the first port, to reselect a port. For ease of description, the selected port is referred to as a second port, and a second network device communicating with the second port is referred to as a second network device 2. A state of the second port is a slave state, and a state of the first port changes to a non-slave state. The first network device receives a clock input signal through the second port, where the clock input signal includes a time or a physical clock signal sent by the second network device 2, and adjusts the clock of the first network device based on the received clock input signal.

Optionally, the tag information is a packet timing signal fail (PTSF) tag.

That a clock input signal jumps means that, when the clock input signal is the time of the second network device 1 for sending, the time offset between the first network device and the second network device 1 obtained by the first network device based on the time sent of the second network device 1 for sending exceeds a time offset threshold; or when the clock input signal is the physical clock signal sent by the second network device 1, a phase difference between a phase of a physical clock signal received by the first port and a phase of a physical clock signal received last time exceeds a phase difference threshold.

Figure 2:
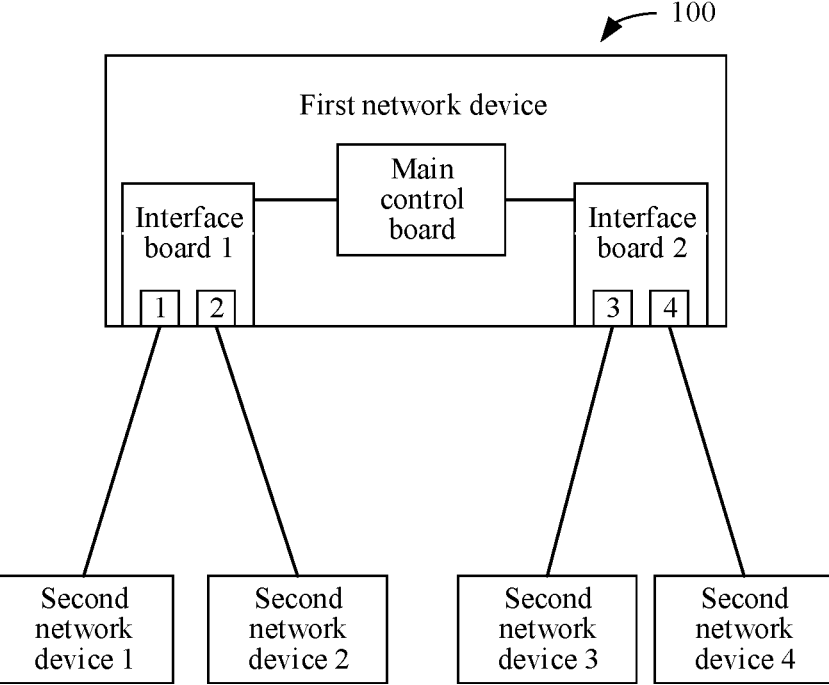
FIG. 2 is a schematic diagram of a structure of a first network device according to an embodiment of the present disclosure.

For the first network device, there may be a plurality of structures of the first network device. The following provides an example of the first network device. Refer to FIG. 2. An embodiment of the present disclosure provides a first network device. The first network device is merely an example, and other examples are not enumerated.

The first network device includes a main control board and at least one interface board. The main control board communicates with each interface board, each interface board includes a plurality of ports, and each port on the interface board communicates with one second network device. The second network device sends data to the first network device, and the data includes clock information, a physical clock signal, and/or the like.

For each of the at least one interface board, each port on the interface board may receive clock information, the first network device performs, based on the clock information received by each port on the interface board, a clock source selection operation, and selects one port as a first port. The interface board sends the physical clock signal received by the first port to the main control board. In this way, the main control board may receive a physical clock signal sent by each interface board, select an optimal physical clock signal from the received physical clock signals, and adjust the clock of the first network device based on the best physical clock signal.

For example, as shown in FIG. 2, the first network device includes the main control board, an interface board 1, and an interface board 2. The main control board separately communicates with the interface board 1 and the interface board 2. The interface board 1 includes a port 1 and a port 2, and the interface board 2 includes a port 3 and a port 4. The port 1 and the port 2 of the interface board 1 respectively communicate with the second network device 1 and the second network device 2, and the port 3 and the port 4 of the interface board 2 respectively communicate with a second network device 3 and a second network device 4.

For the interface board 1, the port 1 of the interface board 1 receives clock information 1 sent by the second network device 1, and the port 2 of the interface board 1 receives clock information 2 sent by the second network device 2. The first network device performs a clock source selection operation based on the clock information 1 and the clock information 2. If the port 1 is selected, the interface board 1 sends the physical clock signal received by the port 1 to the main control board.

For the interface board 2, the port 3 of the interface board 2 receives clock information 3 sent by the second network device 3, and the port 4 of the interface board 2 receives clock information 4 sent by the second network device 4. The first network device performs a clock source selection operation based on the clock information 3 and the clock information 4. If the port 3 is selected, the interface board 2 sends the physical clock signal received by the port 3 to the main control board. The main control board receives the physical clock signal sent by the interface board 1 and the physical clock signal sent by the interface board 2, selects a best physical clock signal from the two received physical clock signals, and adjusts the clock of the first network device based on the best physical clock signal.

For each interface board, a phase of a physical clock signal received by a first interface on the interface board may jump. As a result, the first network device includes tag information in a port attribute of the first port, and the tag information indicates that the first port is in a clock synchronization failed state. In this case, the first network device performs a clock source selection operation on ports excluding the first port on the interface board to reselect a port. For ease of description, the selected port is referred to as a second port. The interface board sends a physical clock signal received by the second port to the main control board, so that the main control board adjusts the clock of the first network device based on the physical clock signal sent by each interface board.

For the first port, a reason why the clock input signal received by the first port jumps may be that the second network device 1 communicating with the first port fails, or a link between the first port and the second network device 1 fails, or the clock source fails in the case that the second network device 1 is a network device through which a link between the first port and a clock source passes. Technical personnel may recover the failure. After the technical personnel recover the failure, the first network device performs a clock source selection operation based on any one of the following embodiments, and uses the clock information received by the first port as a reference object for selecting a clock source during clock source selection.

Optionally, the first network device may be a network element, for example, may be a device such as a switch, a router, a base station, a gateway, an optical transport network (OTN), an optical line terminal (OLT), or an optical network unit (ONU).

Refer to FIG. 3. An embodiment of the present disclosure provides a method for selecting a clock source. The method can be applied to the network architecture 100 shown in FIG. 1, and includes the following steps.

Step 301: A first network device obtains a time offset between the first network device and a second network device 1 through a first port in a clock synchronization failed state.

In step 301, the first network device obtains the time offset by performing the following operations 3011 and 3012, which are as follows.

3011: The first network device obtains synchronization data between the first network device and the second network device through the first port, where a state of the first port is a first state.

When the first network device detects that a clock input signal received by the first port jumps, the first network device may set the state of the first port to the first state, and the state of the first port being the first state remains unchanged. In this case, the first state includes a master state, a monitor state, or a passive state. In this way, the first network device can obtain the synchronization data between the first network device and the second network device in real time through the first port in the first state.

Alternatively, when the first network device detects that a clock input signal received by the first port jumps, the first network device sets the state of the first port to a master state, and then the first network device may periodically set the state of the first port to the first state. In this case, the first state includes a slave state, a monitor state, or a passive state. In this way, the first network device can periodically obtain the synchronization data between the first network device and the second network device through the first port in the first state. In this manner, load of the first network device can be reduced, and less network resources and computing resources of the first network device can be occupied.

It should be noted that, when the first network device detects that the clock input signal received by the first port jumps, the first network device may perform a clock source selection operation to select a second port. In this case, a state of the second port is the slave state. The first network device adjusts a clock of the first network device based on a clock input signal received by the second port, and the clock input signal includes a physical clock signal sent by a second network device 2 communicating with the second port or a time of the second network device 2 for sending.

For example, in the example of the network architecture 100 shown in FIG. 1 an example, assuming that the first port is a port 1, when a clock input signal received by the port 1 jumps, the first network device includes tag information in a port attribute of the port 1, and the tag information marks that the port 1 is in the clock synchronization failed state. In this case, the first network device performs a clock source selection operation, and selects a port 2. A state of the port 2 changes to the slave state. The first network device adjusts the clock of the first network device based on the clock input signal received by the port 2.

Optionally, the first network device obtains the synchronization data between the first network device and the second network device 1 by performing the following operations (1) to (3), which are as follows.

(1) The first network device receives a second Sync packet sent by the second network device 1, where the second Sync packet includes a sending time T1 at which the second network device 1 sends the second Sync packet, and determines a receiving time T2 at which the second Sync packet is received.

The second network device 1 regularly or irregularly sends a Sync packet, and the second Sync packet is a Sync packet currently sent by the second network device 1. When the first state of the first port is the slave state, the master state, the monitor state, or the passive state, the first network device may receive, through the first port, the second Sync packet sent by the second network device 1.

(2) The first network device sends a second Delay_Req packet to the second network device 1, and determines a sending time T3 at which the second Delay_Req packet is sent.

In operation (2), the first network device sends the second Delay_Req packet to the second network device 1 through the first port in the first state.

When the state of the first port remains the first state, the first state includes a master state, a monitor state, or a passive state. When the first state is the master state, the master state is different from a master state defined in the existing standard, and the first port in the master state can send the second Delay_Req packet to the second network device 1, and receive a second Delay_Resp packet sent by the second network device 1 in response to the second Delay_Req packet. When the first state is the monitor state or the passive state, the first port in the monitor state or the passive state can send the second Delay_Req packet to the second network device 1, and receive a second Delay_Resp packet sent by the second network device 1 in response to the second Delay_Req packet.

When the state of the first port is periodically set to the first state, the first state includes a slave state, a monitor state, or a passive state. In this case, when the first network device detects that the clock input signal received by the first port jumps, the first network device sets the state of the first port to the master state, and the first port in the master state cannot send the second Delay_Req packet to the second network device 1 and receive the second Delay_Resp packet sent by the second network device 1 in response to the second Delay_Req packet. In this case, before operation (2) is performed, the state of the first port needs to be set to the first state.

It should be noted that, when the first state is the master state, the monitor state, or the passive state, the state of the second port of the first network device may still be the slave state, and the first network device still adjusts the clock of the first network device based on the clock input signal received by the second port. When the first state is the slave state, that is, when the first network device sets the state of the first port to the slave state, the state of the second port may not be the slave state. In this case, the first network device needs to control the clock of the first network device not to be adjusted based on the clock input signal received by the first port. Therefore, the following case is avoided: The time offset between the first network device and the second network device 1 cannot be accurately obtained because the clock of the first network device is synchronized with the second network device 1.

(3) The first network device receives a second Delay_Resp packet sent by the second network device 1, where the second Delay_Resp packet includes a receiving time T4 at which the second network device 1 receives the second Delay_Req packet.

In operation (3), the first network device receives, through the first port, the second Delay_Resp packet sent by the second network device 1, where the synchronization data includes several of T1, T2, T3, and T4.

3012: The first network device obtains the time offset between the first network device and the second network device 1 based on the synchronization data.

The time offset is equal to $[(T2-T1)-(T4-T3)]/2$, or the time offset is equal to $T4-T3-$ delay, or the time offset is equal to $T4-T3$. delay is a delay between the first network device and the second network device 1, and is based on a length of a link between the first network device and the second network device 1.

The length of the link may be preconfigured for the first network device. The link may be optical fibers or the like.

Step 302: The first network device determines, based on the time offset, whether to refer to, during clock source selection, clock information received by the first port.

When the time offset is less than or equal to a time offset threshold, the first network device determines that the clock input signal received by the first port recovers, that is, the clock input signal does not jump any more, and refers to, during clock source selection, the clock information received by the first port.

When the time offset is less than or equal to the time offset threshold, the first network device may perform a clock source selection operation based on the clock information received by the first port and clock information received by another port on the first network device. That is, the clock information received by the first port is referred to during clock source selection. After the clock source selection operation is performed, a port is selected, and a state of the selected port changes to the slave state. The first network device adjusts a clock of the first network device based on the clock input signal received by the selected port.

Because a port attribute of the first port includes tag information, when the time offset is less than the time offset threshold, the first network device further sets the tag information to indicate that the first port is in a clock synchronization normal state.

In this embodiment of the present disclosure, because the first network device can automatically obtain the time offset between the first network device and the second network device through the first port in the clock synchronization failed state, it may be determined, based on the time offset, that the clock input signal received by the first port recovers, that is, the clock input signal does not jump any more, and the clock information received by the first port is referred to during clock source selection. In this way, after the second network device 1 communicating with the first port, the clock source, or the link connected to the first port is recovered from a failure, the first network device can automatically detect the situation, and use the first port as a reference object during clock source selection, to timely and automatically select a clock source with higher quality for synchronization, thereby improving operation and maintenance efficiency. In addition, when the first state of the first port is the slave state, the first network device controls the clock of the first network device not to be adjusted based on the clock input signal received by the first port. Therefore, the following case can be avoided: The time offset between the first network device and the second network device 1 cannot be accurately obtained because the clock of the first network device is synchronized with the second network device 1, thereby improving accuracy of determining that the clock input signal received by the first port recovers.

Refer to FIG. 4. An embodiment of the present disclosure provides a method for selecting a clock source. The method can be applied to the network architecture 100 shown in FIG. 2, and may be performed by the first network device shown in FIG. 2. The method includes the following steps.

Step 401: A first network device obtains a frequency offset between the first network device and a second network device 1 through a first port in a clock synchronization failed state, and the first port is located on an interface board of the first network device.

Before step 401 is performed, when the first network device detects that a physical clock signal received by the first port on the interface board jumps, the first network device may perform a clock source selection operation, and select a second port from ports excluding the first port on the interface board. The interface board sends a physical clock signal received by the second port to a main control board of the first network device. That a physical clock signal jumps means that a phase difference between a phase of a physical clock signal received by the first port and a phase of a physical clock signal received by the first port last time exceeds a phase difference threshold.

After the second port is selected, the interface board may periodically send the physical clock signal received by the first port to the main control board of the first network device. For ease of description, the physical clock signal received by the first port is referred to as a first physical clock signal, and the first physical clock signal is sent by the second network device 1 communicating with the first port. When sending the first physical clock signal to the first network device, the interface board stops sending, to the main control board of the first network device, the physical clock signal received by the second port.

The main control board of the first network device receives the first physical clock signal, and obtains the frequency offset between the first network device and the second network device 1 based on the first physical clock signal and a second physical clock signal. The second physical clock signal is a local signal of the first network device.

Optionally, an operation of obtaining the frequency offset between the first network device and the second network device 1 is as follows.

Figure 5:
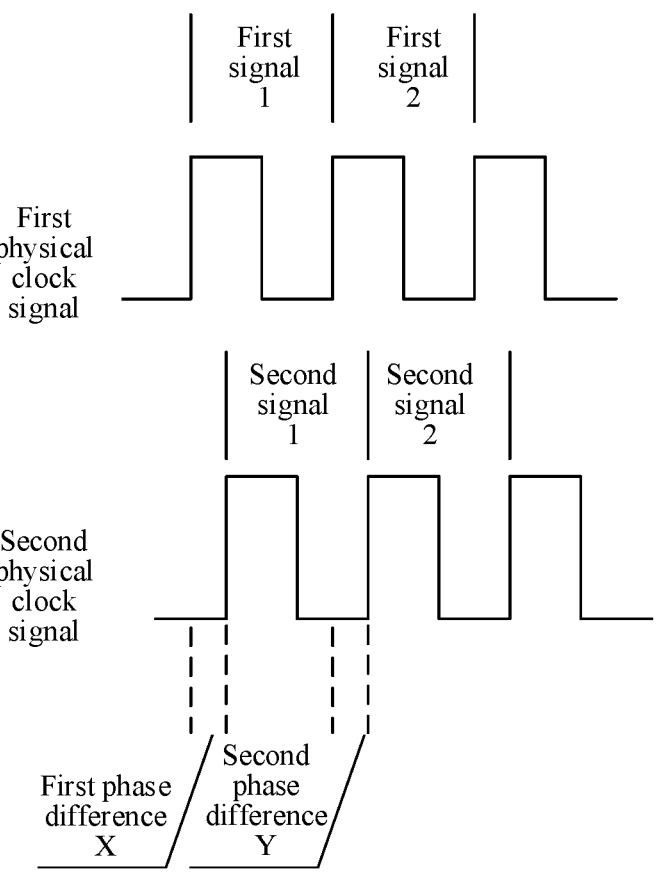
FIG. 5 is a schematic diagram of a first physical clock signal and a second physical clock signal according to an embodiment of the present disclosure.

Refer to FIG. 5. The first physical clock signal includes a plurality of consecutive first signals, the second physical clock signal includes a plurality of consecutive second signals, and each first signal corresponds to one second signal. The first network device selects two adjacent first signals from the first physical clock signal. For ease of description, the two first signals are referred to as a first signal 1 and a first signal 2. The first signal 1 is earlier than the first signal 2, and the second physical clock signal includes a second signal 1 corresponding to the first signal 1 and a second signal 2 corresponding to the first signal 2. The first network device obtains a first phase difference X between the first signal 1 and the second signal 1, obtains a second phase difference Y between the first signal 2 and the second signal 2, and obtains a frequency offset $\Delta f$ between the first network device and the second network device 1, where $\Delta f = Y/X-1$.

In the example of the first network device and the interface board 1 shown in FIG. 2, the interface board 1 sends the physical clock signal received by the port 1 to the main control board, and the interface board 1 further detects the physical clock signal received by the port 1. When it is detected that the physical clock signal received by the port 1 on the interface board 1 jumps, the first network device may perform a clock source selection operation, and reselect a port 2 from ports excluding the port 1 on the interface board 1. The interface board 1 sends the physical clock signal received by the port 2 to the main control board of the first network device.

After the port 2 is selected, the interface board 1 may periodically send the physical clock signal received by the port 1 to the main control board of the first network device. The first physical clock signal is the physical clock signal that is sent by the second network device 1 and that is received by the port 1. In this case, the interface board 1 stops sending, to the main control board of the first network device, the physical clock signal received by the port 2. The main control board of the first network device receives the first physical clock signal, and calculates the frequency offset between the first network device and the second network device 1 based on the first physical clock signal and the local second physical clock signal.

When the interface board sends the first physical clock signal to the main control board of the first network device, the first network device controls the clock of the first network device not to be adjusted based on the first physical clock signal. Therefore, the following case can be avoided: The frequency offset between the first network device and the second network device 1 cannot be accurately calculated because the clock of the first network device is synchronized with the second network device 1 communicating with the first port.

Step 402: The first network device determines, based on the frequency offset, whether to refer to, during clock source selection, the clock information received by the first port.

When the frequency offset is less than the frequency offset threshold, the first network device determines that the first physical clock signal received by the first port recovers, that is, the frequency of the first physical clock signal does not jump, and refers to the clock information received by the first port during clock source selection in the interface board on which the first port is located.

When the frequency offset is less than the frequency offset threshold, the first network device may perform a clock source selection operation based on the clock information received by the first port and clock information received by another port on the interface board. That is, the clock information received by the first port is referred to during clock source selection. After the clock source selection operation is performed, a port is selected, and the interface board sends the physical clock signal received by the selected port to the main control board of the first network device. The main control board of the first network device selects an optimal physical clock signal from physical clock signals sent by interface boards in the first network device, and adjusts the clock of the first network device based on the optimal physical clock signal.

Because the port attribute of the first port includes the tag information, when the frequency offset is less than the frequency offset threshold, the first network device sets the tag information to indicate that the first port is in a clock synchronization normal state.

In this embodiment of the present disclosure, because the first network device can automatically obtain the frequency offset between the first network device and the second network device 1 through the first port in the clock synchronization failed state, it may be determined, based on the frequency offset, that the physical clock signal received by the first port recovers, that is, the physical clock signal does not jump, and the clock information received by the first port is referred to during clock source selection. In this way, after the second network device 1 communicating with the first port, the clock source, or the link connected to the first port is recovered from a failure, the first network device can automatically detect the situation, and use the first port as a reference object during clock source selection, to timely select a clock source with higher quality for synchronization, thereby improving operation and maintenance efficiency. In addition, the first network device further controls the clock of the first network device not to be adjusted based on the first physical clock signal. Therefore, the following case can be avoided: The frequency offset between the first network device and the second network device 1 cannot be accurately calculated because the clock of the first network device is synchronized with the second network device 1 communicating with the first port. This can improve accuracy of determining that the physical clock signal received by the first port recovers.

Figure 6:
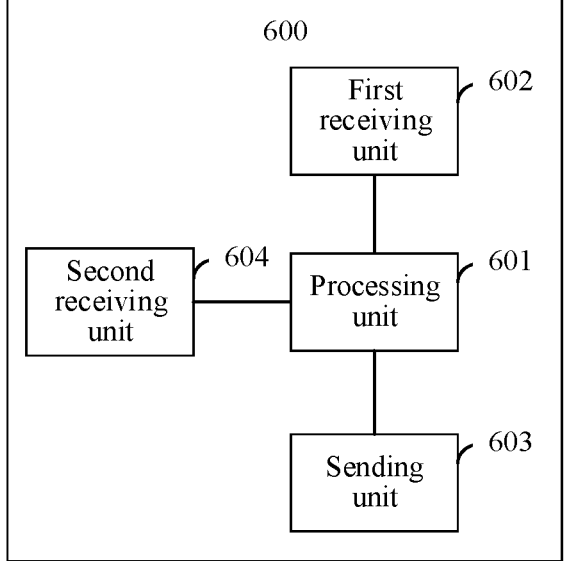
FIG. 6 is a schematic diagram of a structure of an apparatus for selecting a clock source according to an embodiment of the present disclosure.

Refer to FIG. 6. An embodiment of the present disclosure provides an apparatus 600 for selecting a clock source. The apparatus 600 may be deployed on the first network device in any one of the foregoing embodiments. For example, the apparatus 600 is deployed on the first network device in the network architecture 100 shown in FIG. 1 or FIG. 2, or deployed on the first network device in the method shown in FIG. 3, or deployed on the first network device in the method shown in FIG. 4. The apparatus 600 includes: a processing unit 601 configured to obtain synchronization offset data between the apparatus 600 and a second network device through a first port in a clock synchronization failed state.

The processing unit 601 is further configured to determine, based on the synchronization offset data, whether to refer to, during clock source selection, the clock information received by the first port.

Optionally, the synchronization offset data obtained by the processing unit 601 may be a time offset or a frequency offset. For a detailed implementation process of obtaining the time offset by the processing unit 601, refer to related content in step 301 in the embodiment shown in FIG. 3. Details are not described herein again. For a detailed implementation process of obtaining the frequency offset by the processing unit 601, refer to related content in step 401 in the embodiment shown in FIG. 4. Details are not described herein again.

Optionally, the processing unit 601 is configured to, when the synchronization offset data is less than an offset threshold, refer to the clock information received by the first port during clock source selection.

Optionally, for a detailed implementation process in which the processing unit 601 selects the clock source by referring to the clock information received by the first port, refer to related content in step 302 in the embodiment shown in FIG. 3 or step 402 in the embodiment shown in FIG. 4. Details are not described herein again.

Optionally, a port attribute of the first port includes tag information, and the tag information indicates that the first port is in a clock synchronization failed state.

The processing unit 601 is further configured to set, when the synchronization offset data is less than the offset threshold, the tag information to indicate that the first port is in a clock synchronization normal state.

Optionally, the processing unit 601 is configured to: obtain synchronization data between the apparatus and the second network device through the first port, where a state of the first port is a first state; and obtain the synchronization offset data between the apparatus and the second network device based on the synchronization data.

Optionally, for a detailed implementation process in which the processing unit 601 obtains the synchronization data between the apparatus and the second network device, refer to related content in operation 3011 in the embodiment shown in FIG. 3. Details are not described herein again.

Optionally, for a detailed implementation process in which the processing unit 601 obtains the synchronization offset data, refer to related content in operation 3012 in the embodiment shown in FIG. 3. Details are not described herein again.

Optionally, the first state includes a slave state, a master state, a monitor state, or a passive state.

Optionally, the processing unit 601 is further configured to set the state of the first port to the first state.

Optionally, the processing unit 601 is configured to: periodically set the state of the first port to the first state, where the first state includes a slave state, a monitor state, or a passive state.

Optionally, the processing unit 601 is configured to, when the first state is a slave state, control a clock of the apparatus 600 not to be adjusted based on a clock input signal of the first port.

Optionally, the apparatus 600 further includes a first receiving unit 602 and a sending unit 603.

The first receiving unit 602 is configured to receive a synchronization Sync packet sent by the second network device, where the Sync packet includes a sending time T1 at which the second network device sends the Sync packet.

The processing unit 601 is configured to determine a receiving time T2 at which the Sync packet is received.

The sending unit 603 is configured to send a delay request Delay_Req packet to the second network device.

The processing unit 601 is further configured to determine a sending time T3 at which a Delay_Req packet is sent.

The first receiving unit 602 is further configured to receive a delay response Delay_Resp packet sent by the second network device, where the Delay_Resp packet includes a receiving time T4 at which the second network device receives the Delay_Req packet, and the synchronization data includes several of T1, T2, T3, and T4.

Optionally, the synchronization offset data includes a time offset between the apparatus 600 and the second network device.

Optionally, the apparatus 600 further includes a second receiving unit 604.

The second receiving unit 604 is configured to receive, through the first port, a first physical clock signal sent by the second network device.

The processing unit 601 is configured to obtain a frequency offset between the apparatus and a second network device based on the first physical clock signal and a second physical clock signal, where the second physical clock signal is a local signal of the apparatus 600.

Optionally, for a detailed implementation process of obtaining the frequency offset by the processing unit 601, refer to related content in step 401 in the embodiment shown in FIG. 4. Details are not described herein again.

Optionally, the processing unit 601 is further configured to control the clock of the apparatus 600 not to be adjusted based on the first physical clock signal.

In this embodiment of the present disclosure, the processing unit automatically obtains the synchronization offset data between the first network device and the second network device through the first port in the clock synchronization failed state, and determines, based on the synchronization offset data, whether the clock input signal received by the first port recovers. When determining that the clock input signal recovers, the processing unit refers to the clock information received by the first port during clock source selection. In this way, after the second network device communicating with the first port, the clock source, or the link connected to the first port is recovered from a failure, the processing unit automatically detects the situation, and uses the first port as a reference object during clock source selection, to timely and automatically select a clock source with higher quality for synchronization, thereby improving operation and maintenance efficiency.

Figure 7:
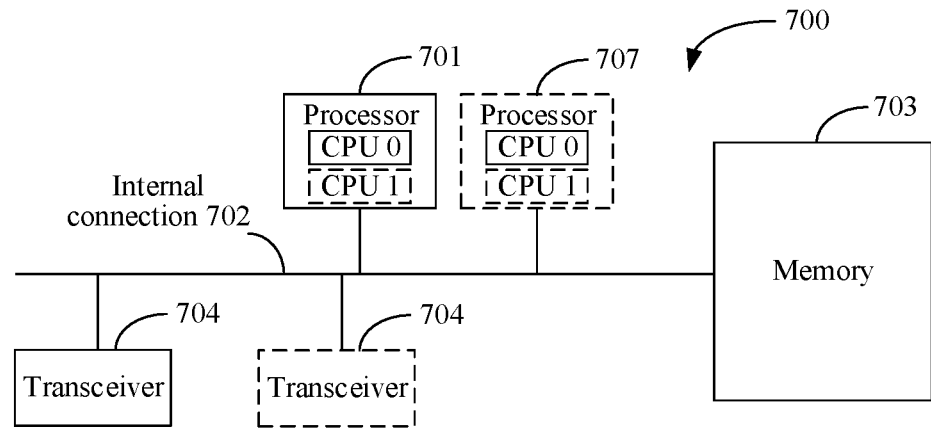
FIG. 7 is a schematic diagram of a structure of another apparatus for selecting a clock source according to an embodiment of the present disclosure.

Refer to FIG. 7. An embodiment of the present disclosure provides a schematic diagram of an apparatus 700 for selecting a clock source. The apparatus 700 may be the first network device in any one of the foregoing embodiments. For example, the apparatus 700 is the first network device in the network architecture 100 shown in FIG. 1 or FIG. 2, or the first network device in the method shown in FIG. 3, or the first network device in the method shown in FIG. 4. The apparatus 700 includes at least one processor 701, an internal connection 702, a memory 703, and at least one transceiver 704.

The apparatus 700 is an apparatus of a hardware structure, and may be configured to implement functional modules in the apparatus 600 in FIG. 6. For example, a person skilled in the art may figure out that the processing unit 601 in the apparatus 600 shown in FIG. 6 may be implemented by the at least one processor 701 by calling code in the memory 703, and the first receiving unit 602, the sending unit 603, and the second receiving unit 604 in the apparatus 600 shown in FIG. 6 may be implemented by the transceiver 704.

Optionally, the apparatus 700 may further be configured to implement functions of the first network device in any one of the foregoing embodiments.

Optionally, the processor 701 may be a general-purpose central processing unit (CPU), a network processor (NP), a microprocessor, an application-specific integrated circuit (ASIC), or one or more integrated circuits configured to control program execution of solutions of the present disclosure.

The internal connection 702 may include a channel for transmitting information between the foregoing components. Optionally, the internal connection 702 is a board, a bus, or the like.

The transceiver 704 is configured to communicate with another device or a communication network.

The memory 703 may be a read-only memory (ROM) or another type of static storage device that can store static information and instructions, or a random-access memory (RAM) or another type of dynamic storage device that can store information and instructions; or may be an electrically erasable programmable read-only memory (EEPROM), a compact disc read-only memory (CD-ROM) or another optical disc storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory may exist independently, and is connected to the processor through the bus. The memory may alternatively be integrated with the processor.

The memory 703 is configured to store application program code for executing the solutions in the present disclosure, and the processor 701 controls execution. The processor 701 is configured to execute the application program code stored in the memory 703, and cooperate with the at least one transceiver 704, so that the apparatus 700 implements functions in the method in this patent.

During specific implementation, in an embodiment, the processor 701 may include one or more CPUs, for example, a CPU 0 and a CPU 1 in FIG. 7.

During specific implementation, in an embodiment, the apparatus 700 may include a plurality of processors, for example, the processor 701 and a processor 707 shown in FIG. 7. Each of the processors may be a single-core (single-CPU) processor, or may be a multi-core (multi-CPU) processor. The processor herein may be one or more devices, circuits, and/or processing cores configured to process data (for example, computer program instructions).

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of the present disclosure, but are not intended to limit the present disclosure. Any modification, equivalent replacement, or improvement made without departing from the principle of the present disclosure should fall within the protection scope of the present disclosure.

What is claimed is:

1. A method implemented by a first network device for selecting a clock source, the method comprising:
   receiving, through a first port, a synchronization packet from a second network device, wherein the first port is in a clock synchronization failed state;
   determining, based on the synchronization packet, that the port is in a clock synchronization normal state;
   receiving, by the first port, clock information after receiving the synchronization packet; and
   determining, based on the first port being in the clock synchronization normal state, to refer to the clock information during clock source selection.

2. The method of claim 1, wherein a port attribute of the first port comprises tag information, wherein a first value of the tag information indicates that the first port is in the clock synchronization failed state, and wherein the method further comprises setting the tag information to a second value, wherein the second value indicates that the first port is in a clock synchronization normal state.

3. The method of claim 1, wherein a state of the first port is a first state, and wherein the method further comprises obtaining synchronization offset data between the first network device and the second network device based on the synchronization packet.

4. The method of claim 3, wherein the first state comprises a slave state, a master state, a monitor state, or a passive state.

5. The method of claim 4, further comprising setting the state of the first port to the first state.

6. The method of claim 5, wherein setting the state of the first port to the first state comprises periodically setting the state of the first port to the first state, wherein the first state comprises the slave state, the monitor state, or the passive state.

7. The method of claim 4, further comprising controlling, when the first state is the slave state, a clock of the first network device to not be adjusted based on a clock input signal of the first port.

8. The method of claim 3, further comprising obtaining synchronization data between the first network device and the second network device, wherein obtaining the synchronization data comprises:

receiving a Sync packet from the second network device, wherein the Sync packet comprises a first sending time T1 indicating when the Sync packet was sent;

determining a first receiving time T2 at which the Sync packet is received;

sending a delay request (Delay_Req) packet to the second network device at a second sending time T3;

determining T3; and receiving a delay response (Delay_Resp) packet from the second network device, wherein the Delay_Resp packet comprises a second receiving time T4 based on the Delay_Req packet, and wherein the synchronization data comprises at least one of T1, T2, T3, or T4.

9. The method of claim 8, further comprising obtaining synchronization offset data between the first network device and the second network device according to the synchronization data, wherein the synchronization offset data comprises a time offset between the first network device and the second network device.

10. The method of claim 1, further comprising obtaining synchronization data between the first network device and the second network device, wherein obtaining the synchronization data comprises:

receiving, through the first port, a first physical clock signal from the second network device; and obtaining synchronization offset data between the first network device and a second network device by obtaining a frequency offset between the first network device and the second network device based on the first physical clock signal and a second physical clock signal, wherein the second physical clock signal is a local signal of the first network device.

11. The method of claim 10, further comprising controlling a clock of the first network device to not be adjusted based on the first physical clock signal.

12. A first network device comprising:

one or more processors; and a memory configured to store program instructions, which, when executed by the one or more processors, cause the first network device to:

receive, through a first port, a synchronization packet from a second network device, wherein the first port is in a clock synchronization failed state;

determine, based on the synchronization packet, that the port is in the clock synchronization normal state;

receive, by the first port, clock information after receiving the synchronization packet; and determine, based on the first port being in the clock synchronization normal state, to refer to the clock information during clock source selection.

13. The first network device of claim 12, wherein a port attribute of the first port comprises tag information, wherein a first value of the tag information indicates that the first port is in the clock synchronization failed state; and wherein the program instructions further cause the first network device to set the tag information to a second value, wherein the second value indicates that the first port is in a clock synchronization normal state.

14. The first network device of claim 12, wherein a state of the first port is a first state, and wherein the program instructions further cause the first network device to obtain synchronization offset data between the first network device and the second network device based on the synchronization packet.

15. The first network device of claim 14, wherein the first state comprises a slave state, a master state, a monitor state, or a passive state.

16. The first network device of claim 15, wherein the program instructions further cause the first network device to set the state of the first port to the first state.

17. The first network device of claim 16, wherein the program instructions further cause the first network device to periodically set the state of the first port to the first state.

18. The first network device of claim 15, wherein the program instructions further cause the first network device to control, when the first state is the slave state, a clock of the first network device to not be adjusted based on a clock input signal of the first port.

19. The first network device of claim 14, wherein the program instructions further cause the first network device to obtain synchronization data between the first network device and the second network device, wherein the program instructions to obtain the synchronization data comprises program instructions to:

receive a Sync packet from the second network device, wherein the Sync packet comprises a first sending time T1 indicating when the Sync packet was sent;

determine a first receiving time T2 at which the Sync packet is received;

send a delay request (Delay_Req) packet to the second network device at a second sending time T3;

determine T3; and receive a delay response (Delay_Resp) packet from the second network device, wherein the Delay_Resp packet comprises a second receiving time T4 based on the Delay_Req packet, and wherein the synchronization data comprises at least one of T1, T2, T3, or T4.

20. The first network device of claim 14, wherein synchronization offset data comprises a time offset between the first network device and the second network device.

21. The first network device of claim 12, wherein the program instructions further cause the first network device to:

receive, through the first port, a first physical clock signal from the second network device; and obtain a frequency offset between the first network device and the second network device based on the first physical clock signal and a second physical clock signal, wherein the second physical clock signal is a local signal of the first network device.

22. The first network device of claim 21, wherein the program instructions further cause the first network device to control a clock of the first network device to not be adjusted based on the first physical clock signal.

23. A computer program product comprising computer-executable instructions that are stored on a non-transitory computer-readable medium and that, when executed by one or more processors, cause a first network device to:

receive, through a first port, a synchronization packet from a second network device, wherein the first port is in a clock synchronization failed state;

determine, based on the synchronization packet, that the port is in the clock synchronization normal state;

receive, by the first port, clock information after receiving the synchronization packet; and determine, based on the first port being in the clock synchronization normal state, to refer to the clock information during clock source selection.

24. The computer program product of claim 23, wherein a port attribute of the first port comprises tag information, wherein a first value of the tag information indicates that the first port is in the clock synchronization failed state, and wherein the computer-executable instructions when executed by the one or more processors further cause the first network device to set the tag information to a second value, wherein the second value indicates that the first port is in a clock synchronization normal state.

25. The computer program product of claim 23, wherein a state of the first port is a first state, and wherein the first state comprises a slave state, a master state, a monitor state, or a passive state.

26. The computer program product of claim 23, wherein the computer-executable instructions when executed by the one or more processors further cause the first network device to obtain synchronization data between the first network device and the second network device through the synchronization packet, wherein the computer-executable instructions to obtain the synchronization data comprises computer-executable instructions to:

receive a synchronization (Sync) packet from the second network device, wherein the Sync packet comprises a first sending time T1 indicating when the Sync packet was sent;

determine a first receiving time T2 at which the Sync packet is received;

send a delay request (Delay_Req) packet to the second network device at a second sending time T3;

determine T3; and receive a delay response (Delay_Resp) packet from the second network device, wherein the Delay_Resp packet comprises a second receiving time T4 based on the Delay_Req packet, and wherein the synchronization data comprises at least one of T1, T2, T3, or T4.

27. The computer program product of claim 26, wherein the computer-executable instructions when executed by the one or more processors further cause the first network device to obtain synchronization offset data between the first network device and the second network device based on the synchronization data, wherein the synchronization offset data comprises a time offset between the first network device and the second network device.

28. The method of claim 1, wherein determining that the first port is in the clock synchronization normal state comprises:

obtaining synchronization offset data between the first network device and the second network device based on the synchronization packet; and determining that the synchronization offset data is less than an offset threshold.

29. The first network device of claim 12, wherein the program instructions further cause the first network device to:

obtain synchronization offset data between the first network device and the second network device based on the synchronization packet; and determine that the first port is in the clock synchronization normal state when the synchronization offset data is less than an offset threshold.

30. The computer program product of claim 23, wherein the computer-executable instructions when executed by the one or more processors further cause the first network device to:

obtain synchronization offset data between the first network device and the second network device based on the synchronization packet; and determine that the first port is in the clock synchronization normal state when the synchronization offset data is less than an offset threshold.

* * * * *